US006672728B1

(12) United States Patent
Su et al.

(10) Patent No.: US 6,672,728 B1
(45) Date of Patent: Jan. 6, 2004

(54) EXTERIOR REARVIEW MIRROR WITH AUTOMATICALLY ADJUSTED VIEW ANGLE

(75) Inventors: Wen-Wei Su, Taoyuan (TW);
Kuei-Hung Chen, Toayuan (TW);
Shun-Hsiang Hsiao, Taoyuan (TW)

(73) Assignee: Exon Science Inc., Taoyuan (TW)

( * ) Notice: Subject to any disclaimer, the term of this patent is extended or adjusted under 35 U.S.C. 154(b) by 0 days.

(21) Appl. No.: 09/946,094

(22) Filed: Sep. 4, 2001

(51) Int. Cl.[7] .................................................. G02B 5/08
(52) U.S. Cl. ........................................................ 359/843
(58) Field of Search .................................... 359/843, 844

(56) References Cited

U.S. PATENT DOCUMENTS

| 4,679,158 | A | * | 7/1987 | Tate .......................... 700/302 |
| 5,132,851 | A | * | 7/1992 | Bomar et al. ................ 359/843 |
| 5,719,713 | A | * | 2/1998 | Brown ........................ 359/843 |
| 5,835,291 | A | * | 11/1998 | Takayama .................... 359/843 |
| 5,953,168 | A | * | 9/1999 | Valentino ..................... 359/843 |
| 6,193,380 | B1 | * | 2/2001 | Jacobs ......................... 359/843 |
| 6,217,177 | B1 | * | 4/2001 | Rost ............................ 359/843 |
| 6,380,536 | B1 | | 4/2002 | Inoue et al. |

* cited by examiner

*Primary Examiner*—Euncha Cherry
(74) *Attorney, Agent, or Firm*—Volpe and Koenig, P.C.

(57) ABSTRACT

A control device of for automatically adjusting a view angle of a rearview mirror of a vehicle is disclosed. The control device includes a turning detector mounted on the vehicle for generating a triggering signal in response to a turning operation of a user; and a drive circuit electrically connected to the turning detector for moving the rearview mirror along a certain direction from an initial position toward a predetermined position in response to the triggering signal. The turning detector, for example, can be an indicator-light switch or a tire-angle switch.

12 Claims, 6 Drawing Sheets

EXTERIOR REARVIEW MIRROR WITH AUTOMATICALLY ADJUSTED VIEW ANGLE

FIELD OF THE INVENTION

The present invention relates to a control device of an exterior rearview mirror, and more particular to a control device for automatically adjusting a view angle of the exterior rearview mirror.

BACKGROUND OF THE INVENTION

When a driver is seated in a vehicle, he should adjust all of the interior and exterior rearview mirrors according to his need. The rearview mirror can be adjusted manually or automatically by pushing buttons. After the adjustment of rearview mirrors is done, the view angle of each rearview mirror seen by the driver is constant, and it is difficult and also dangerous for the driver to further change the view angles while driving.

Figure 1A:
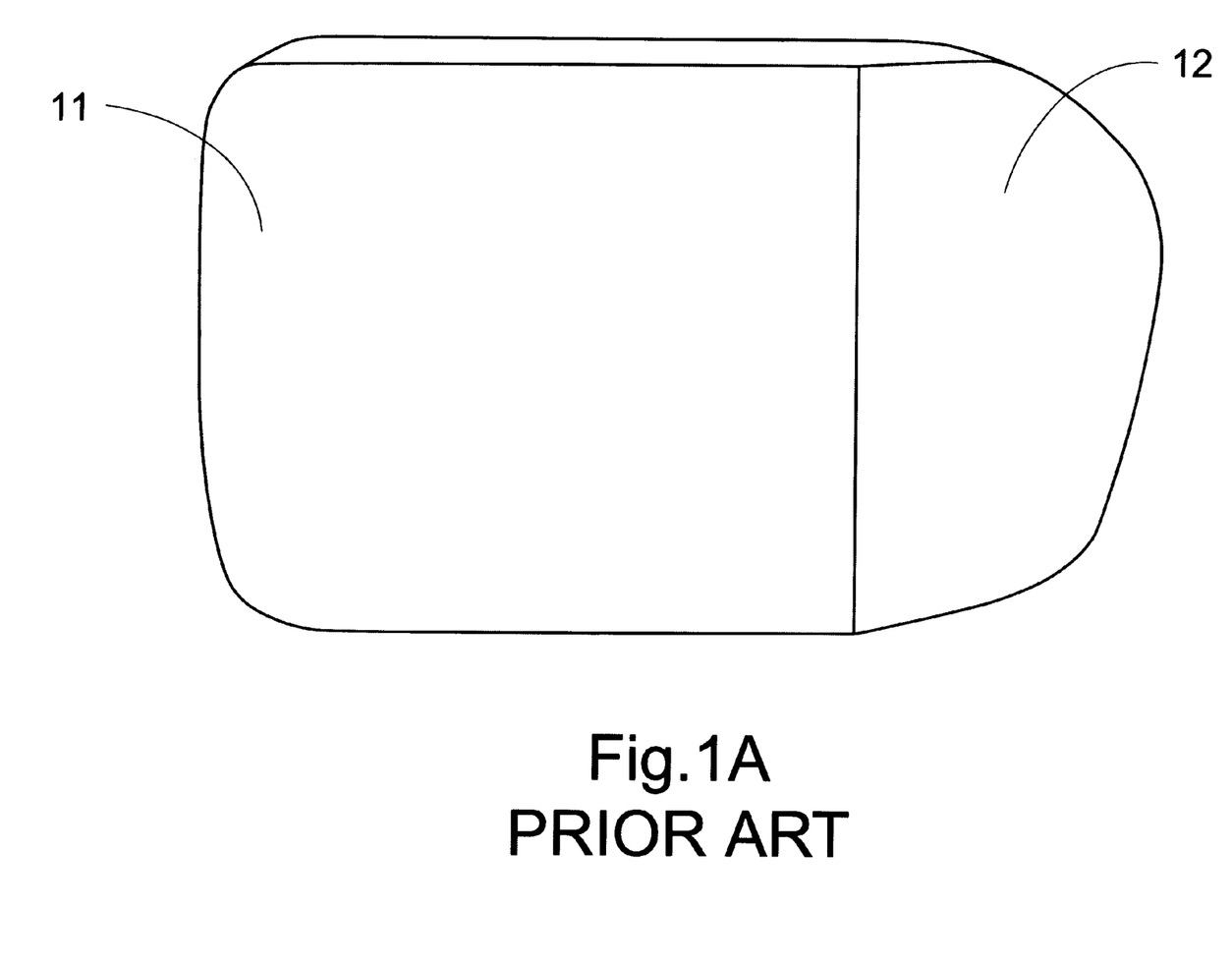
FIG. 1A is a schematic diagram showing a conventional rearview mirror having a relatively large view angle.
Figure 1B:
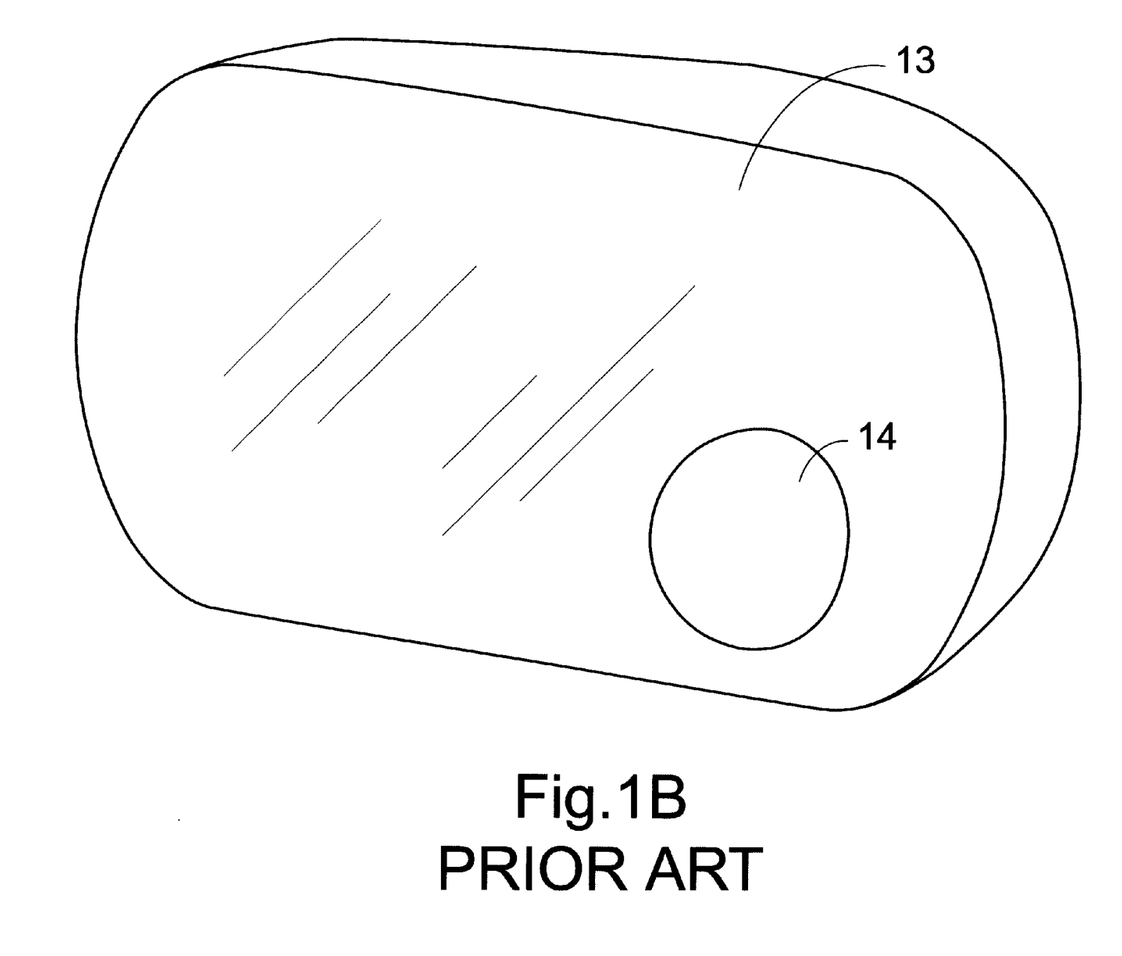
FIG. 1B is a schematic diagram showing another conventional rearview mirror having a relatively large view angle.

In practice, when a driver would like to change to another lane or turn to another direction, he will need to realize more about the situation of the adjacent lane to see whether there is any vehicle oncoming. For a simple plane mirror serving as the exterior rearview mirror, the view angle is not wide enough. Therefore, a mirror consisting of two sections is developed to solve this problem, as shown in FIG. 1. The two sections, for example, may be two plane mirrors 11, 12 deflected from each other (FIG. 1A) by a fixed angle, or one plane mirror 13 and one curved bump 14 (FIG. 1B). This kind of rearview mirror, although improves the view angle to some extent, still has the following disadvantages. First, the manufacturing and assembling processes of the two-sectional mirror are complicated. Further, the outer section of the mirror is generally small, so it is uneasy for the driver to watch it clearly, especially for the mirror at the passenger's side.

SUMMARY OF THE INVENTION

Therefore, an object of the present invention is to provide a control device of an exterior rearview mirror, which can adjust the view angle of the rearview mirror automatically without touching any special buttons or keys.

According to a first aspect of the present invention, a control devise for automatically adjusting a view angle of a rearview mirror of a vehicle, comprising: a turning detector mounted on the vehicle for generating a first triggering signal in response to a first turning operation of a user; a first drive circuit electrically connected to the turning detector for moving the rearview mirror along a first direction from an initial position toward a predetermined position in response to the first triggering signal.

Preferably, the control device further includes a first comparing unit for optionally generating a first drive signal in response to a comparing result of a variable voltage value varying with a first movement degree of the rearview mirror with a first reference value; and a first controlled switch electrically connected to the first comparing unit, the turning detector and the first drive circuit, and conducted to output the first drive signal in response to the first triggering signal, wherein the drive circuit moves the rearview mirror along the first direction from the initial position toward the pre-determined position in response to the first drive signal.

More preferably, the control device further includes an outward boundary adjuster electrically connected to the first comparing unit for determining the predetermined position of the rearview mirror and thus pre-setting the first reference value.

In an embodiment, the control device further includes a second comparing unit for optionally generating a second drive signal in response to a comparing result of the variable voltage value with a second reference value; a second controlled switch electrically connected to the second comparing unit and the turning detector, and conducted to output the second drive signal in response to a second triggering signal generated by the turning detector in response to a second turning operation of a user, wherein the first and the second controlled switches are not conducted at the same time; and a second drive circuit electrically connected to the second controlled switch for moving the rearview mirror along a second direction toward the initial position in response to the second drive signal.

Preferably, the control device further includes an inward boundary adjuster electrically connected to the second comparing unit for determining the initial position of the rearview mirror and thus pre-setting the second reference value.

In an embodiment, the turning detector includes an indicator-light switch, the first turning operation is to switch on an indicator light, and the second turning operation is to switch off the indicator light.

In another embodiment, the turning detector includes a tire-angle switch, the first turning operation is to turn a tire to exceed a threshold angle, and the second turning operation is to return the tire within the threshold angle.

Under the control of the present control device, the rearview mirror can be automatically moved as a whole in response to the first triggering signal. Alternatively, a portion of the rearview mirror can be automatically moved in response to the first triggering signal, and another portion of the the rearview mirror remains unmoved.

A second aspect of the present invention relates to a control device for automatically adjusting a view angle of a rearview mirror of a vehicle, which includes a turning detector mounted on the vehicle for generating a first triggering signal in response to a first turning operation of a user; a control circuit electrically connected to the turning detector for generating a first drive signal in response to a variable voltage value varying with a first movement degree of the rearview mirror and a first reference value representing a first boundary position of the rearview mirror; and a first drive circuit electrically connected to the turning detector for moving the rearview mirror along a first direction from an initial position toward the boundary position in response to the first triggering signal and the first drive signal.

In an embodiment, the control circuit includes a first comparing unit for optionally generating the first drive signal in response to a comparing result of the variable voltage value with the first reference value; and a first controlled switch electrically connected to the first comparing unit, the turning detector and the first drive circuit, and conducted to output the first drive signal in response to the first triggering signal.

Preferably, the control circuit further includes an outward boundary adjuster electrically connected to the first comparing unit for determining the boundary position of the rearview mirror and thus pre-setting the first reference value.

More preferably, the control circuit further includes a second comparing unit for optionally generating a second drive signal in response to a comparing result of the variable voltage value with a second reference value; a second controlled switch electrically connected to the second comparing unit and the turning detector, and conducted to output the second drive signal in response to a second triggering signal generated by the turning detector in response to a second turning operation of a user, wherein the first and the second controlled switches are not conducted at the same time; and a second drive circuit electrically connected to the second controlled switch for moving the rearview mirror along a second direction toward the initial position in response to the second drive signal. The control circuit preferably further includes an inward boundary adjuster electrically connected to the second comparing unit for determining the initial position of the rearview mirror and thus pre-setting the second reference value.

A third aspect of the present invention relates to a control device for automatically adjusting a view angle of a rearview mirror of a vehicle, which includes a turning detector mounted on the vehicle for generating a triggering signal in response to a turning operation; a drive circuit electrically connected to the turning detector for moving the rearview mirror along a certain direction from an initial position toward a predetermined position in response to the triggering signal; an outward boundary adjuster electrically connected to the drive circuit for determining the predetermined position of the rearview mirror; and an inward boundary adjuster electrically connected to the drive circuit for determining the initial position of the rearview mirror.

A fourth aspect of the present invention relates to a method for automatically adjusting a view angle of a rearview mirror of a vehicle. The method includes steps of presetting an initial position of the rearview mirror; presetting a movement condition of the rearview mirror; detecting whether a first turning operation on the vehicle is performed; and moving the rearview mirror from the initial position under the movement condition in response to the first turning operation.

In an embodiment, the movement condition is to rotate the rearview as a whole by a predetermined angle. Alternatively, the movement condition is to rotate a portion of the rearview by a predetermined angle.

In an embodiment, the first turning operation is to switch on an indicator light of the vehicle. Alternatively, the first turning operation is to rotate a tire of the vehicle to exceed a predetermined degree.

Preferably, the method further includes steps of detecting whether a second turning operation on the vehicle is performed; and moving the rearview mirror toward the initial position in response to the second turning operation.

In an embodiment, the first and second turning operations are to switch on and off an indicator light, respectively. Alternatively, the first and second turning operations are to rotate a tire of the vehicle exceeding and within a predetermined degree, respectively.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 5:
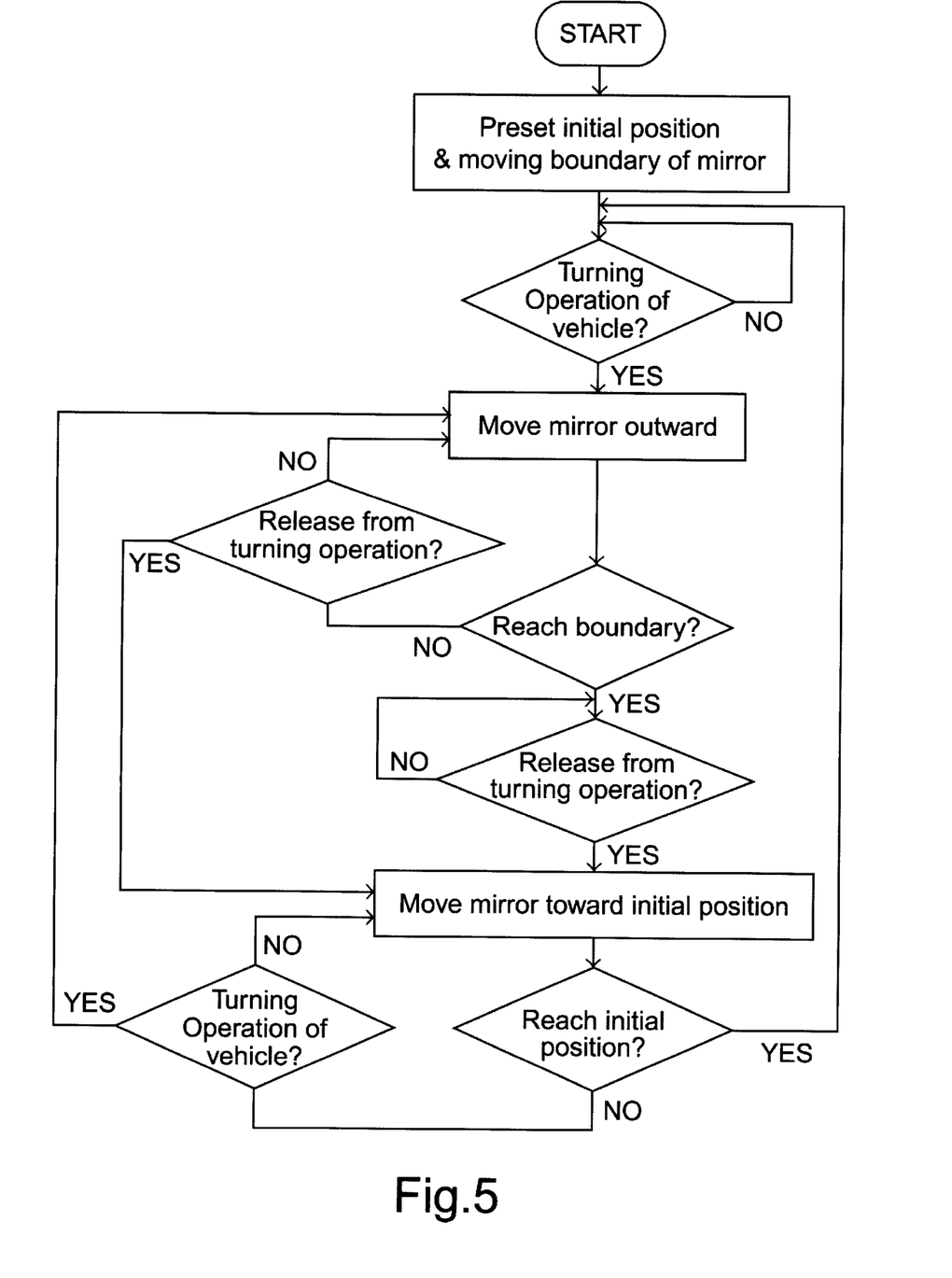
FIG. 5 is a flowchart schematically showing the principle of the present invention to automatically adjust a view angle of a rearview mirror of a vehicle.

In order to allow the rearview mirror to be automatically adjusted while driving, a method is illustrated herein with reference to a flowchart of FIG. 5 for achieving that purpose. It is to be noted that the flowchart of FIG. 5 is for illustrating one of the rear mirrors, and a similar operation may be applied to the other rearview mirror.

First of all, an initial position of the rearview mirror is preset by adjusting the rearview mirror before driving. During the drive, if it is desired to turn the vehicle right, the thing that the driver should do is to switch the right indicator light on. Meanwhile, the rearview mirror will be triggered to rotate outwards to enlarge the view angle. The outward movement of the rearview mirror is preferred to be confined within a proper boundary. In other words, when the mirror reaches the moving boundary, the mirror will not rotate further even if the indicator light is still on. On the other hand, no matter if the mirror reaches the moving boundary or not, the mirror moves toward the initial position upon the same indicator light is switched off. Likewise, during the trip of the mirror back to the initial position, no matter if the mirror reaches the initial position or not, the mirror is rotated outward again upon the indicator light is switched on. Embodiments of the control device for executing the present method are illustrated hereinafter.

Figure 2:
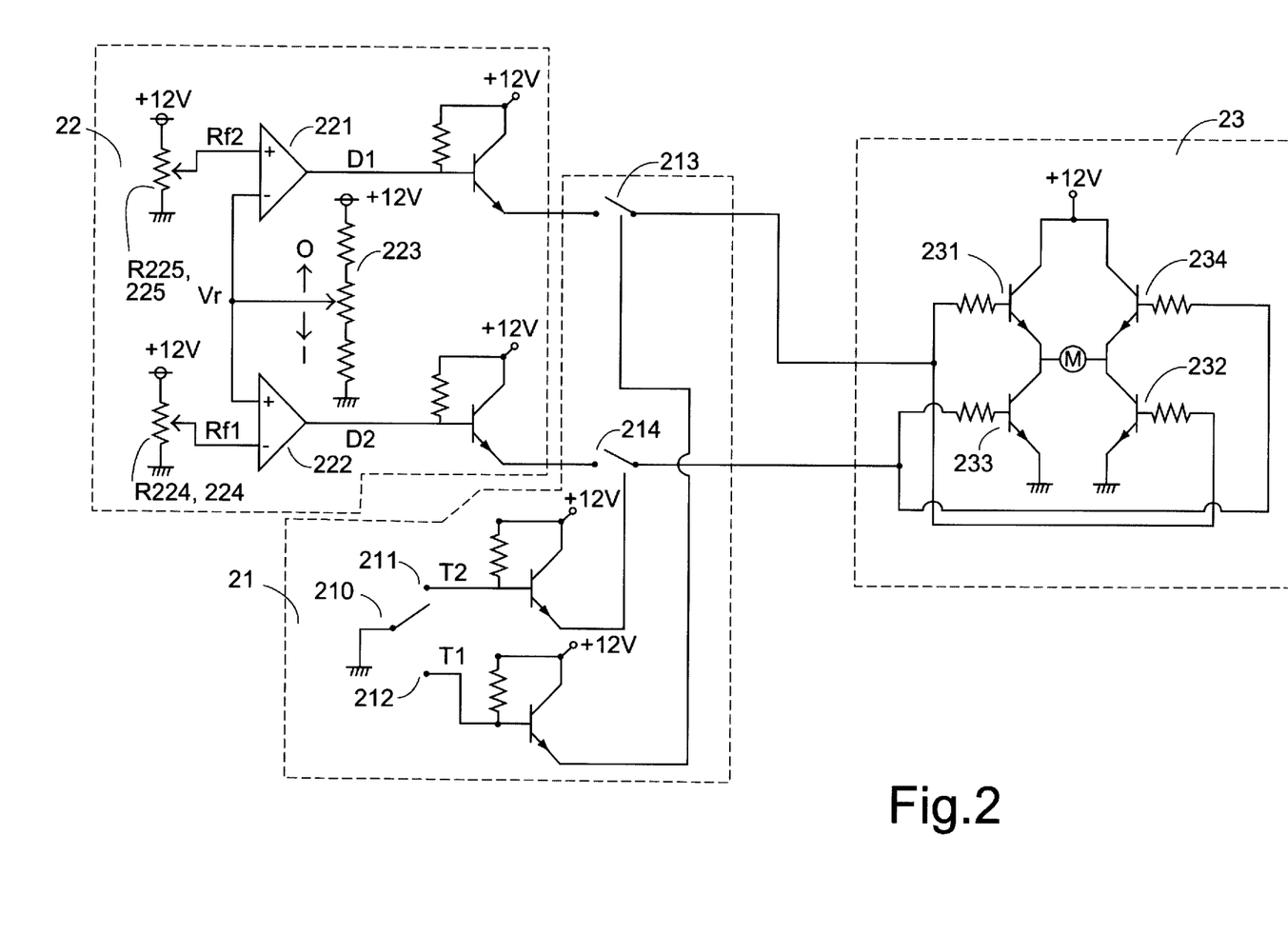
FIG. 2 is a schematic circuit diagram showing a preferred embodiment of a control device according to the present invention.
Figure 3:
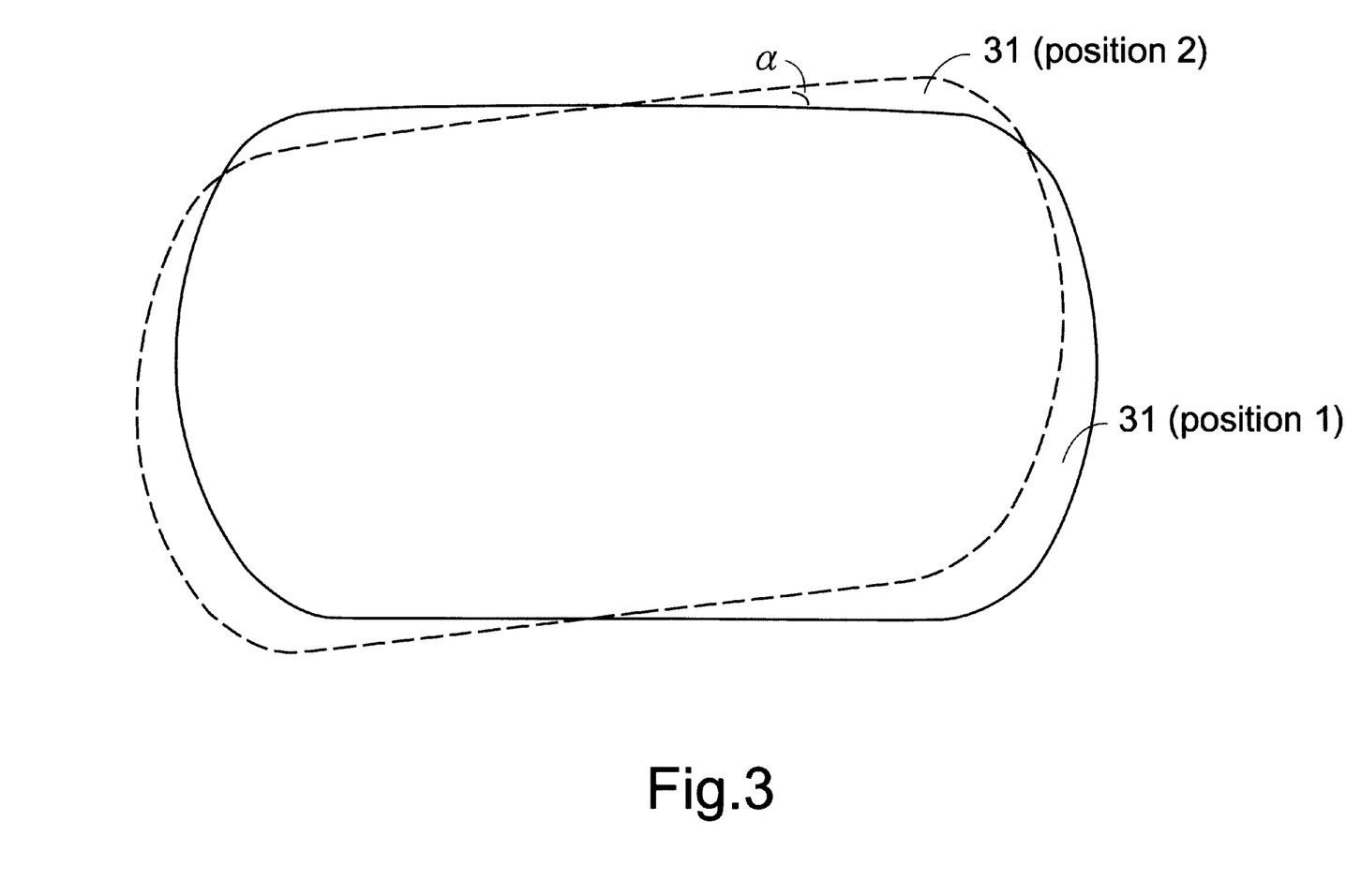
FIG. 3 is a schematic diagram showing an embodiment of a moving operation of a rearview mirror under the control of the control device according to the present invention.

Please refer to FIG. 2 which is a schematic circuit diagram showing a preferred embodiment of a control device for controlling one of the exterior electrochromic rearview mirror assemblies according to the present invention. The control device includes a turning detector 21, a control circuit 22 and a drive circuit 23 interconnected as shown. The turning detector 21 includes an indicator-light switch 210, and two controlled switches 213 and 214. The control circuit 22 includes two comparing units 221 and 222, a variable resistor 223, an inward boundary adjuster 224, and an outward boundary adjuster 225. The drive circuit 23 includes a first drive path 231-motor-232, and a second drive path 233-motor-234. The indicator-light switch 210 is optionally switched between a first conducting manner 211 indicating that an indicator light is switched on, and a second conducting manner 212 indicating that the indicator light is switched off. In the first conducting manner 211, a first triggering signal T1 is outputted to conduct the switch 213. On the other hand, a second triggering signal T2 is outputted in the second conducting manner 212 to conduct the switch 214. The conduction of the switch 213 allows a drive signal D1, if any, to pass through the first path 231-motor-232 so as to drive the motor of the rearview mirror assembly to rotate in a first direction. On the other hand, the conduction of the switch 214 allows a drive signal D2, if any, to pass through the second path 233-motor-234 so as to drive the motor of the rearview mirror assembly to rotate in a second direction opposite to the first direction. It is assumed that the control device of FIG. 2 is used for controlling the right rearview mirror of a vehicle. The first rotation direction of the motor transmits the rearview mirror 31 to rotate by an angle α so as to move from a position 1 to a position 2, as shown in FIG. 3. The angle α is ranged between 0~70 degrees, and preferably 10~20 degrees. Afterwards, when the vehicle is released from the turning operation, the motor is driven to rotate in the second direction, as mentioned above, until the rearview mirror 31 moves from the position 2 back to the position 1. The determination of the position 1 and position 2, and the positioning operation are described hereinafter.

When a driver is seated into the vehicle and adjusts the view angle of the rearview mirror according to his need, the pointer of the variable resistor R224 of the inward boundary adjuster 224 will move along with the rearview mirror so as to obtain an inward boundary position. Once the inward boundary position (position 1) is determined, a reference voltage value Rf1 is also determined. Likewise, the outward boundary (position 2) and thus a reference voltage value Rf2 can be predetermined by the user or the manufacturer by tuning the variable resistor R225 of the outward boundary adjuster 225. The voltage value Vr is compared with the reference voltage values Rf1 and Rf2 dynamically in the comparing units 221 and 222, respectively. When the rearview mirror is rotated outwards, i.e. counterclockwise, from the position 1 in response to the activation of the indicator light, the pointer of the variable resistor 223 moves in the direction O. The comparing unit keeps on outputting the drive signal D1 to rotate the motor in the first direction and rotate the rearview mirror outwards until Vr approximates Rf2. At this time, the drive signal D1 is no more outputted, and the rearview mirror is stopped at the position 2. It is to noted that while the drive signal D1 is being outputted or after the drive signal D1 has stopped, the drive signal D2 is still outputted except for the initial moment that Vr approximates Rf1. However, owing to the off-circuit of the switch 214, the drive signal D2 will not be transmitted to the drive circuit 23 to drive the motor. Once the switch 214 is conducted by switching to the second conduction manner 212 before or after the rearview mirror reaches the position 2, the drive signal D2 rather than the drive signal D1 is outputted to rotate the motor in the second direction. In other words, the rearview mirror is transmitted back toward the initial position 1, and finally stops at the position 1 on the condition that no further triggering signal T1 is outputted.

Figure 4:
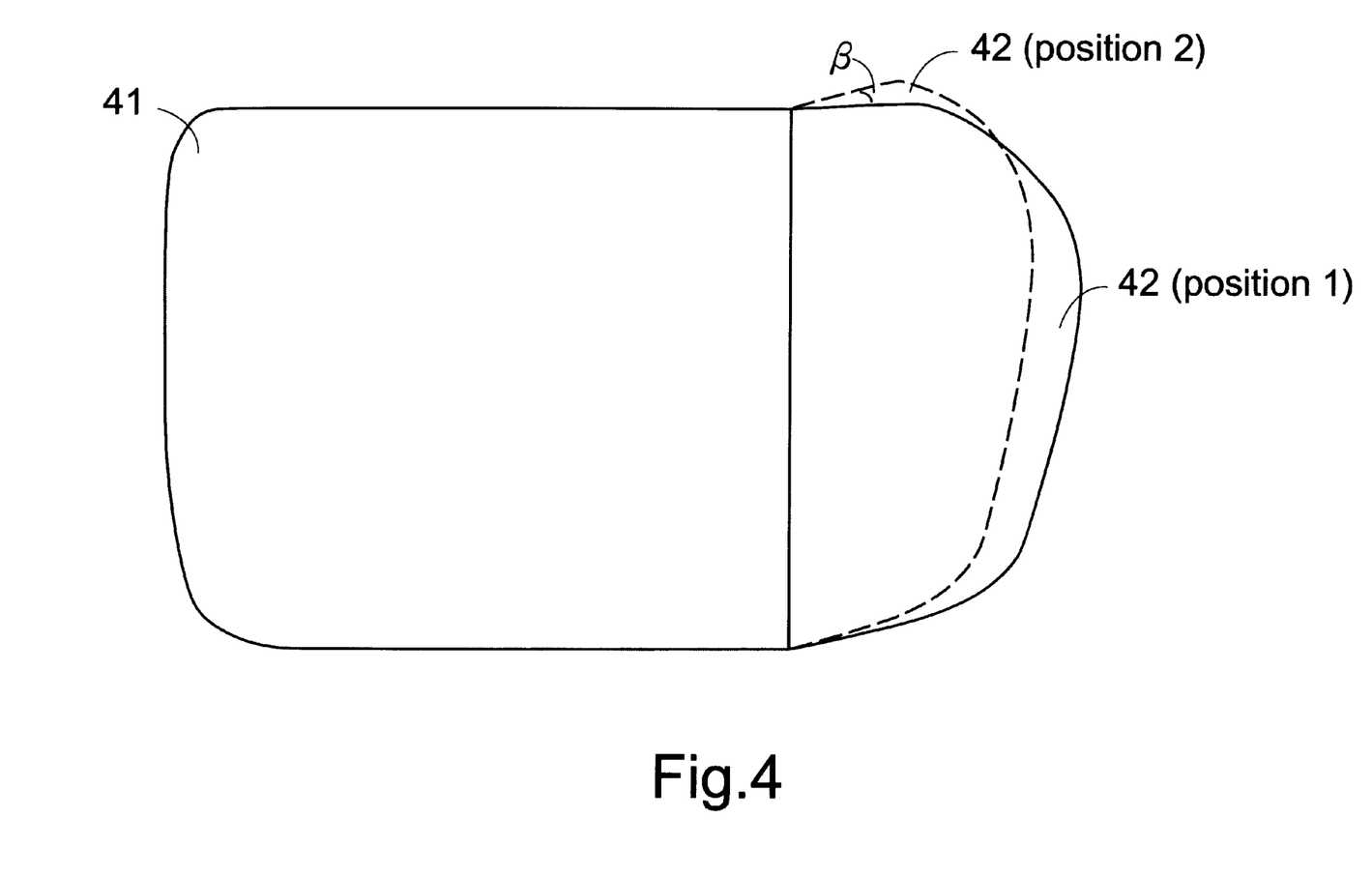
FIG. 4 is a schematic diagram showing another embodiment of a moving operation of a rearview mirror under the control of the control device according to the present invention.

In the embodiment described above, the motor for transmitting the rearview mirror between the position 1 and the position 2 is the same one for transmitting the rearview mirror to the inward boundary position 1. The mirror is rotated as a whole, as shown in FIG. 3. Alternatively, the mirror may be divided into two plane sections 41 and 42. The section 42 is pivotally connected to the section 41, as shown in FIG. 4. Under the current rearview-mirror driving mechanism, additional driving means may be required to transmit the section 2 only. The same control device as mentioned above with reference to FIG. 2, however, can be used for changing the view angle of the rearview mirror of FIG. 4.

By using a similar control device of FIG. 2, the turning detector 21 may include a tire-angle switch instead of an indicator-light switch 210. When a designated one of the tires, generally a front tire, turns exceeding a predetermined angle, it will result in the first conduction manner 211, and similar operations as mentioned above in the first conduction manner are performed. Likewise, the operations corresponding to the second conduction manner 212 are performed when the tire returns to the initial position.

It is understood that all the above description is for illustrating the operations relative to one of the rearview mirror assemblies. A duplicated control device may be provided for controlling another rearview mirror assembly.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control device for automatically adjusting a view angle of a rearview mirror of a vehicle, comprising:
   a turning detector mounted on said vehicle for generating a first triggering signal in response to a first turning operation of a user;
   a first variable voltage-divider for being adjusted to divide a first constant voltage into a first reference value;
   a second variable voltage-divider outputting a variable voltage value in response to a first movement degree of said rearview mirror;
   a first comparing unit optionally generating a first drive signal in response to a comparing result of said variable voltage value with said first reference value;
   a first controlled switch electrically connected to said first comparing unit and said turning detector, and conducted to output said first drive signal in response to said first triggering signal; and
   a first drive circuit electrically connected to said turning detector and said first controller switch, and moving said rearview mirror along a first direction from an initial position toward a predetermined position in response to said first drive signal.

2. The control device according to claim 1 further comprising:
   a third variable voltage-divider for being adjusted to divide a second constant voltage into a second reference value;
   a second comparing unit for optionally generating a second drive signal in response to a comparing result of said variable voltage value with said second reference value;
   a second controlled switch electrically connected to said second comparing unit and said turning detector, and conducted to output said second drive signal in response to a second triggering signal generated by said turning detector in response to a second turning operation of a user, wherein said first and said second controlled switches are not conducted at the same time; and
   a second drive circuit electrically connected to said second controlled switch for moving said rearview mirror along a second direction toward said initial position in response to said second drive signal.

3. The control device according to claim 2 wherein said turning detector includes an indicator-light switch, said first turning operation is to switch on an indicator light, and said second turning operation is to switch off said indicator light.

4. The control device according to claim 2 wherein said turning detector includes a tire-angle switch, said first turning operation is to turn a tire to exceed a threshold angle, and said second turning operation is to return said tire within said threshold angle.

5. The control device according to claim 1 wherein said rearview mirror is moved as a whole in response to said first triggering signal.

6. The control device according to claim 1 wherein a portion of said rearview mirror is moved in response to said first triggering signal, and another portion of the said rearview mirror remains unmoved.

7. The control device according to claim 2 wherein said first, second and third variable voltage-dividers are variable resistors.

8. A control device for automatically adjusting a view angle of a rearview mirror of a vehicle, comprising:

a tire-angle switch mounted on said vehicle for generating a first triggering signal in response to a first turning operation of a tire exceeding a threshold angle;

a control circuit electrically connected to said tire-angle switch for generating a first drive signal in response to a variable voltage value varying with a first movement degree of said rearview mirror and a first reference value representing a first boundary position of said rearview mirror; and a first drive circuit electrically connected to said tire-angle switch for moving said rearview mirror along a first direction from an initial position toward said boundary position in response to said first triggering signal and said first drive signal.

9. The control device according to claim 8 wherein said control circuit includes:

a first comparing unit for optionally generating said first drive signal in response to a comparing result of said variable voltage value with said first reference value; and a first controlled switch electrically connected to said first comparing unit, said tire-angle switch and said first drive circuit, and conducted to output said first drive signal in response to said first triggering signal.

10. The control device according to claim 9 wherein said control circuit further includes an outward boundary adjuster electrically connected to said first comparing unit for determining said boundary position of said rearview mirror and thus pre-setting said first reference value.

11. The control device according to claim 9 wherein said control circuit further includes:

a second comparing unit for optionally generating a second drive signal in response to a comparing result of said variable voltage value with a second reference value;

a second controlled switch electrically connected to said second comparing unit and said tire-angle switch, and conducted to output said second drive signal in response to a second triggering signal generated by said tire-angle switch in response to a second turning operation of said tire returning within said threshold angle, wherein said first and said second controlled switches are not conducted at the same time; and a second drive circuit electrically connected to said second controlled switch for moving said rearview mirror along a second direction toward said initial position in response to said second drive signal.

12. The control device according to claim 11 wherein said control circuit further includes an inward boundary adjuster electrically connected to said second comparing unit for determining said initial position of said rearview mirror and thus pre-setting said second reference value.

* * * * *